United States Patent [19]

Stover et al.

[11] 4,116,456
[45] Sep. 26, 1978

[54] SHOPPING CART

[75] Inventors: Don A. Stover, Moore; Norman R. Young; Glenmore J. Runnion, both of Oklahoma City, all of Okla.

[73] Assignee: Unarco Industries, Inc., Chicago, Ill.

[21] Appl. No.: 798,295

[22] Filed: May 19, 1977

[51] Int. Cl.² .............................................. B62B 3/00
[52] U.S. Cl. ........................ 280/33.99 B; 186/1 AC; 280/33.99 F
[58] Field of Search ................. 280/33.99 B, 33.99 F, 280/33.99 R, 33.99 S, 33.99 H, 33.99 A, 47.35; 186/1 AC

[56] References Cited

U.S. PATENT DOCUMENTS

| | | | |
|---|---|---|---|
| 2,615,726 | 10/1952 | Brottman | 280/47.35 |
| 2,998,978 | 9/1961 | Sides | 280/33.99 B |
| 3,503,622 | 3/1970 | Romero | 280/33.99 F |
| 3,751,059 | 8/1973 | Dunder et al. | 280/33.99 F |
| 3,815,932 | 6/1974 | Ruger | 280/33.99 F |

Primary Examiner—Joseph F. Peters, Jr.
Assistant Examiner—Milton L. Smith
Attorney, Agent, or Firm—Dressler, Goldsmith, Clement, Gordon & Shore, Ltd.

[57] ABSTRACT

A shopping cart having a novel locking arrangement for the gate of the upper basket and featuring a baby basket that seats a child below the level of the upper basket for enhanced stability of the cart and economy of storage in the upper basket, as well as to position and face the child towards the mother who is pushing the cart so that the child cannot reach or kick the gate or the groceries in the upper basket. The novel locking arrangement for the gate includes a latch plate having an end restraining shield that provides an abutment stop for limiting the forward movement of the gate unless the gate is manually lifted and opened. The gate has ears which prevent the gate from falling into the interior of the basket, and has at least one pin that engages the end restraining shield. Auxiliary side walls are mounted above the sides of the baby basket to prevent the child from reaching items on the shelves of the store and to protect the child from the corners of shelves and from being accidentally struck by other carts. The rear wall of the upper basket is positioned above the back support of the baby basket to assist in supporting the back of the child. The shopping cart also features side handles extending above the auxiliary side walls for improved maneuverability and for eliminating the conventional crossbar-type handle to remove the possibility of the child bumping his forehead on such a handle.

13 Claims, 6 Drawing Figures

SHOPPING CART

BACKGROUND OF THE INVENTION

This invention relates to a shopping cart, and more particularly, to a shopping cart having an improved gate catch and baby basket.

Shopping carts have various types of front gates which can be lowered to unload groceries and other articles conveniently from the upper basket of the cart. U.S. Pat. Nos. 3,645,554, 3,245,498, 3,297,108, and U.S. Pat. No. Re. 25,616 are typical of such gate constructions. Some of the conventional gate constructions, however, can be easily manipulated and opened by a child, or will sometimes open accidentally if the cart is being improperly pulled by the front gate. Moreover, some conventional gates have a tendency to open when the shopping cart is being pushed along a parking lot, curb or other bumpy surface, which may then cause the groceries in the cart to spill out.

Conventional shopping carts usually have a collapsible baby basket located within the interior of the upper basket. U.S. Pat. Nos. 2,508,670, 2,662,775, 2,813,725, 2,837,344, 2,871,024, 2,916,291, 2,896,959, 2,931,662, 3,157,410 and 3,184,248 illustrate various types of baby baskets located within the interior of an upper basket of a shopping cart. Such an arrangement, however, occupies valuable storage space and results in a relatively high center of gravity for both the shopping cart and the child sitting in the baby basket. It is elementary physics that the higher the center of gravity of an object, the greater the tendency of that object or mass to tip over or fall, if not properly supported. Thus a shopping cart having a high center of gravity has a greater tendency to tip over and cause the baby sitting in the baby basket to accidentally fall out of the cart if the cart and the baby seat are not properly supported, than a shopping cart having a low center of gravity.

Another problem which can occur with traditional shopping carts is that the child can often reach into the interior of the upper basket and grab various items, which the child may break or injure himself with or throw into the aisle to present a danger for others. Or the child can lift up the front gate and cause the groceries in the cart to spill into the aisle. Sometimes, the child can also reach items on the shelf and tip over displays.

Another type of shopping cart has a baby basket positioned below the upper basket, as, for example, U.S. Pat. Nos. 3,297,108 and 3,245,498. These prior art constructions, however, position the child facing generally toward the front of the cart and directly below the bottom of the upper basket, which permits the child sitting in the basket to kick the bottom of the upper basket and break or otherwise damage groceries in the basket, or to kick, lift or in some other manner open the gate of the upper basket, or to kick groceries in any bottom basket that may be included in the cart. These prior art constructions also permit the child to reach items on the shelves and tip over displays. Moreover, such prior art constructions do not adequately protect the child from accidentally being struck by other carts or by the corners of shelves. Because the baby is facing away from his mother who is pushing one of these prior art carts, the mother cannot see her baby's face or effectively tend to his needs.

SUMMARY OF THE INVENTION

A shopping cart is provided with an improved baby basket which overcomes most, if not all, of the disadvantages of the prior art carts and affords greater protection for the baby who is sitting in the baby basket. The shopping cart also has an improved gate catch which reliably secures the gate in an upright closed position, and prevents the gate from accidentally opening when the cart is being pushed over a curb, parking lot or other bumpy surface.

In accordance with the present invention, the shopping cart is provided with an elongated upper basket having a bottom for carrying groceries or other items. The upper basket has a pair of spaced elongated side walls which extend upwardly from the bottom and a pair of spaced upright end walls, including a rear wall and a front wall or gate, extending between the side walls.

The improved baby basket is spaced from the interior of the upper basket and includes a seat positioned below the level of the bottom of the upper basket so that the child's center of gravity is substantially below the level of the bottom of the upper basket. The baby basket includes a back support extending upwardly from the seat and a crotch-like end wall spaced rearwardly of both the rear wall of the upper basket and the back support so as to be positioned outside the area directly below the bottom of the upper basket. The crotch-like end wall defines a pair of leg holes for positioning the child facing away from, as well as remote from, the front wall or gate of the upper basket to substantially prevent the child from reaching into the upper basket and from kicking the bottom of the upper basket or the gate. A pair of spaced lower side walls extend between the back support and the crotch-like end wall to contain and protect the child.

A support frame is provided for supporting the above structure. The support frame includes a base having front and rear wheels and post-like supports extending upwardly from the base. The post-like supports carry baby-basket supports and an upper basket support cantilevered from the post-like supports to support the upper basket.

In the preferred embodiment, the back support of the baby basket and the rear wall of the upper basket are positioned in general vertical alignment with each other and are positioned closely adjacent each other so that the rear wall also serves to support the back of the child. Preferably, the shopping cart includes a pair of upright auxiliary side walls extending longitudinally from the rear wall of the upper basket in a direction away from the front wall or gate of the upper basket. The auxiliary side walls are located generally above the lower side walls of the baby basket to substantially prevent the child from putting his arms laterally outward of the baby basket and reaching the gate or items on the shelves of the store. The auxiliary side walls also provide a protective barrier or shield for the child's arms and sides.

Desirably, the post-like supports define a pair of handles which extend upwardly from and are positioned in generally vertical alignment with the auxiliary side walls. The shopping cart is constructed and arranged so that there is a clearance space between the auxiliary side walls above the crotch-like end wall to safely permit forward rocking movement of the child's head without bumping the child's forehead on any crosswise extending member.

The baby basket of the illustrated embodiment also includes a leg hole closure or flap pivotally connected to the seat. The flap is movable within the interior of the baby basket from a cushioning position lying upon the seat to an upright closure position against the crotch-like end wall to substantially block the leg holes to permit groceries to be carried in the baby basket.

The shopping cart also features a striker or leg hole closure activating member connected to the seat of the baby basket. The striker has a generally U-shaped bight or striker head which extends longitudinally from the seat and is located beneath the upper basket for striking and pivoting the leg hole closure of an adjacent shopping cart to the upright closure position during nesting of the shopping carts.

In some situations it is desirable to position an elongated lower basket on the base of the support frame at a level below the baby basket for carrying the groceries and other items. The lower basket is located longitudinally opposite and spaced away from the leg holes of the baby basket to substantially prevent the child from kicking the groceries on the lower basket.

The novel gate catch construction of the present invention permits the gate to be secured and pivoted from an upright closed position for retaining groceries in the upper basket to a downward open position for unloading groceries from the upper basket. The gate has a pivotable cross-member positioned generally at the bottom of the gate and adjacent the bottom of the upper basket when the gate is in an upright closed position. The gate also has an ear which extends laterally outward past each of the elongated side walls of the upper basket for engaging the side walls of the upper basket to prevent the gate from substantially falling into the interior of the upper basket when the gate is in an upright closed position. Each of the ears include a pin projecting laterally inwardly to secure the gate in its closed position or permit it to be opened when the gate is manipulated in a manner to be explained below.

The gate catch includes a first latch plate and a second latch plate secured to each of the bottom corners of the elongated side walls of the upper basket adjacent the bottom of the upper basket and the gate. Each of the latch plates includes an end restraining shield spaced in front of the elongated side walls of the upper basket and projecting laterally inwardly to abut against the pins of the ears so as to hold the gate reliably in an upright closed position. This arrangement substantially prevents the gate from accidentally opening in the store or when the shopping cart is being pushed over a curb, or upon a parking lot or other bumpy surface.

Each of the latch plates defines a vertically aligned elongate slot for slidably receiving the pivotable cross-member of the gate. The lot is of a length to permit the cross-member to move from a lower position, when the gate is in an upright closed position, to an upper position, when the gate is lifted, to enable the pins that extend from the ears of the gate to be moved above the end restraining shield of the latch plates and to be subsequently lowered to an unrestrained position in front of the end restraining shield when opening the gate.

A more detailed explanation of the invention is provided in the following description and appended claims taken in conjunction with the accompanying drawing.

DETAILED DESCRIPTION OF THE ILLUSTRATED EMBODIMENT

Figure 1:
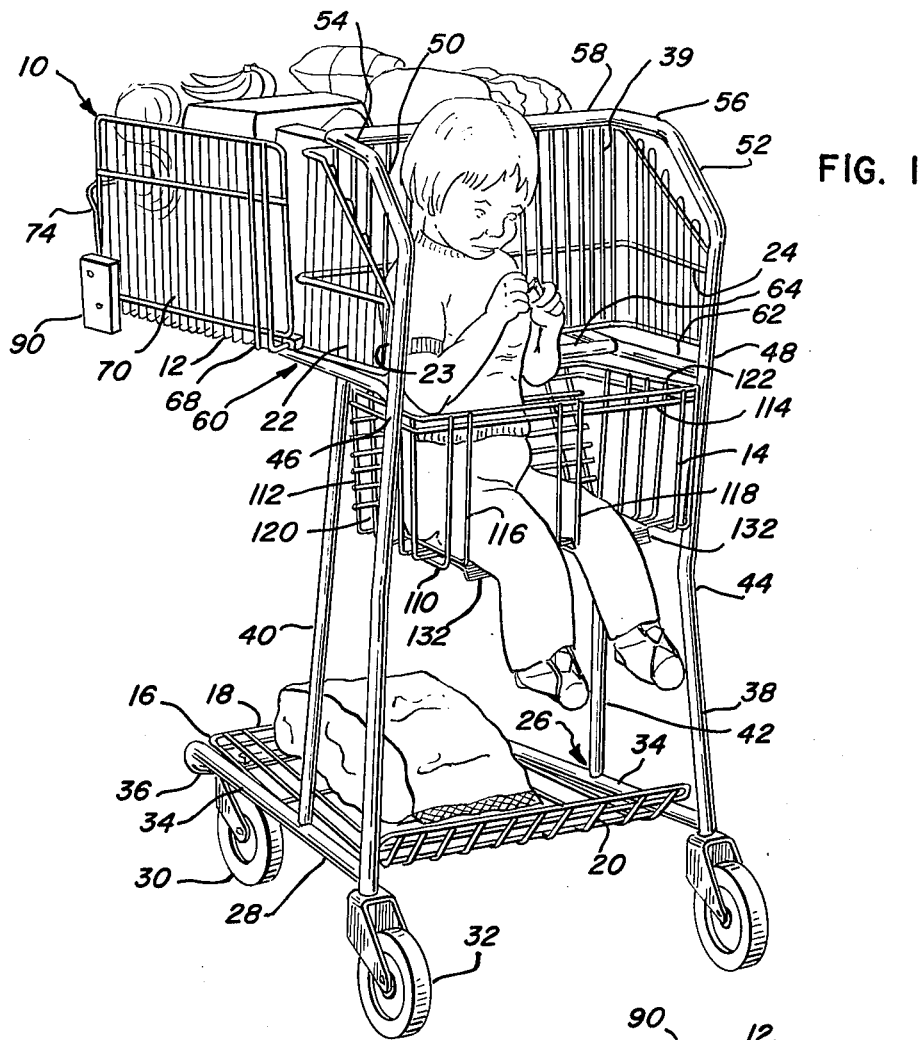
FIG. 1 is a perspective view of a shopping cart carrying a child and groceries in accordance with principles of the present invention.

The drawing illustrates a shopping cart 10 for use in a grocery store or the like. Although the shopping cart of the present invention is particularly useful in grocery stores, it is to be understood that shopping cart 10 can be used in various situations, for carrying items other than groceries.

As seen in FIG. 1, the shopping cart includes an elongated upper basket 12 for counter-level discharge of groceries when the shopping cart is being unloaded at the checkstand, a baby basket 14 for carrying a baby or small child, and an elongated lower basket 16 for carrying additional items, which are often bulky, such as potatoes, watermelon, bags of dog food and cartons of soft drinks.

The lower basket 16 has a planar bottom surface 18 and a sloping rear wall 20 which is inclined upwardly and rearwardly. If desired, the lower basket can also be provided with a pair of tapered side walls and an upwardly turned lip or front section.

The shopping cart 10 further features upright auxiliary side walls 22 and 24 which are positioned above the baby basket 14 and rearwardly of the upper basket 12 for preventing the child from putting his arms laterally outward from the baby basket 14 and reaching items on the shelves of the store, and for providing a barrier to protect the child's arms and sides from corners of shelves and from other carts.

Upper basket 12, baby basket 14, lower basket 16, and auxiliary side walls 22 and 24 are constructed of a plurality of rigid metal wires, in a manner well known in the art, so as to form open wire grids. It may be desirable, however, in some circumstances to construct the baby basket 14 or the other baskets 12 and 18 or side walls 22 and 24 out of other materials, such as impact-resistant plastic, and/or to provide solid walls for the baskets and auxiliary side walls.

A support frame 26 is provided for supporting the above structure. The support frame 26 is preferably of tubular metal construction and includes a base 28 for supporting and carrying the lower basket 16. Base 28 generally defines an undercarriage having front and rear wheels or casters, 30 and 32, respectively. The base 28 is generally U-shaped and has generally forwardly converging horizontal runs or sides 34 (to permit nesting of adjacent carts when desired) and a downwardly-turned nose or toe 36 at its front end.

The support frame 26 further includes post-like supports or uprights 38, including front posts 40 and 42 extending upwardly from each of the horizontal runs 34, respectively, of the base 28 to a position adjacent the rear wall 39 of the upper basket 12. The post-like supports 38 also include an inverted, generally U-shaped upright member 44, as viewed from the rear of the shopping cart 10. The inverted U-shaped member 44 has elongated upright arms 46 and 48 spaced rearwardly of front posts 40 and 42 and extending upwardly from the horizontal runs 34 of the base 28 to a position above the baby basket. Arms 46 and 48 preferably extend to a height slightly above the vertical centerlines of both the auxiliary side walls 22 and 24 and the rear wall 39 of the upper basket 12. Arms 46 and 48 are vertically aligned with the auxiliary side walls 22 and 24 so that the respective rearward ends of the auxiliary side walls 22 and 24 (as, for example, member 23 in FIG. 1), are welded to the upper portions of the arms 46 and 48.

Handles or hand grips 50 and 52 extend upwardly from the arms 46 and 48, respectively, and are inclined forwardly towards the top of the rear wall 39 of the upper basket 12. Each hand grip 50 and 52 is in general vertical alignment with an auxiliary side wall 22 or 24, respectively. Hand grips 50 and 52 provide manually-graspable surfaces which give the shopper improved maneuverability and control when pushing the cart.

The upper ends of the hand grips 50 and 52 are integrally connected to horizontal runners 54 and 56, respectively, which extend forwardly to a position adjacent the top of the rear wall 39 of the upper basket 12. A cross bar 58 connects the forward ends of the horizontal runners 54 and 56 and is positioned generally parallel and adjacent the top of the rear wall 39 of the upper basket 12.

Figure 5:
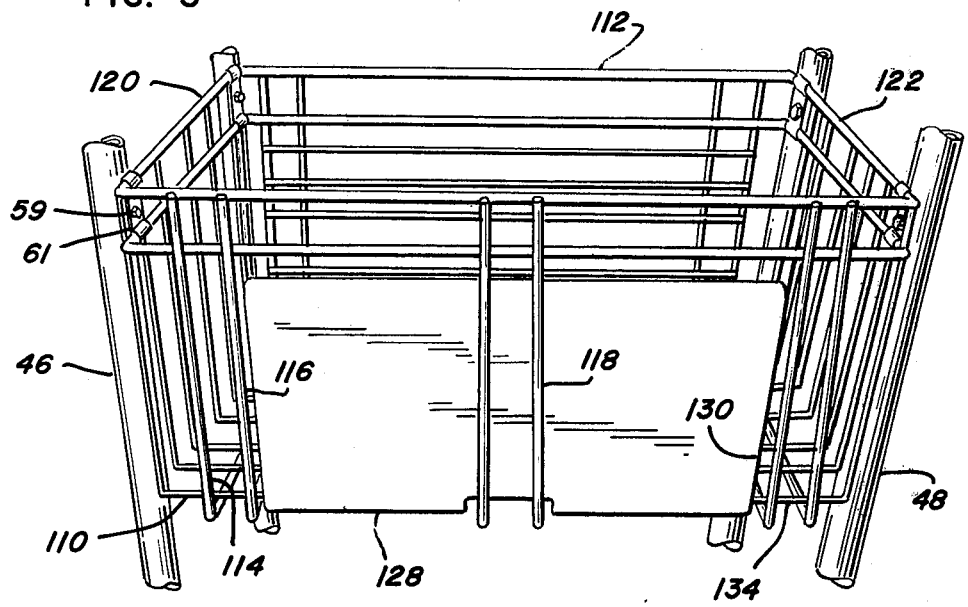
FIG. 5 is an enlarged perspective view of the baby basket with a flap removably positioned against the crotch-like end wall and blocking the leg holes when it is desired to carry groceries in the baby basket.

Portions of the front posts 40 and 42 and portions of the upright arms 46 and 48 provide inwardly facing surfaces and define a baby-basket support, located below the bottom of the upper basket 12. As shown in FIG. 5, the baby-basket support includes fastening means such as bolts 59, threaded fasteners or welds for securing the sides of the baby basket 14 to the support frame 26 via metal mounting plates 61 (FIG. 5). In some situations, it may be desirable that the baby basket support include upwardly extending hooks or fingers upon which the sides of the baby basket 14 can be removably held. In other situations, it may be desirable to provide a cross member between the arms 46 and 48, or front posts 40 and 42, for supporting the baby basket 14.

Figure 4:
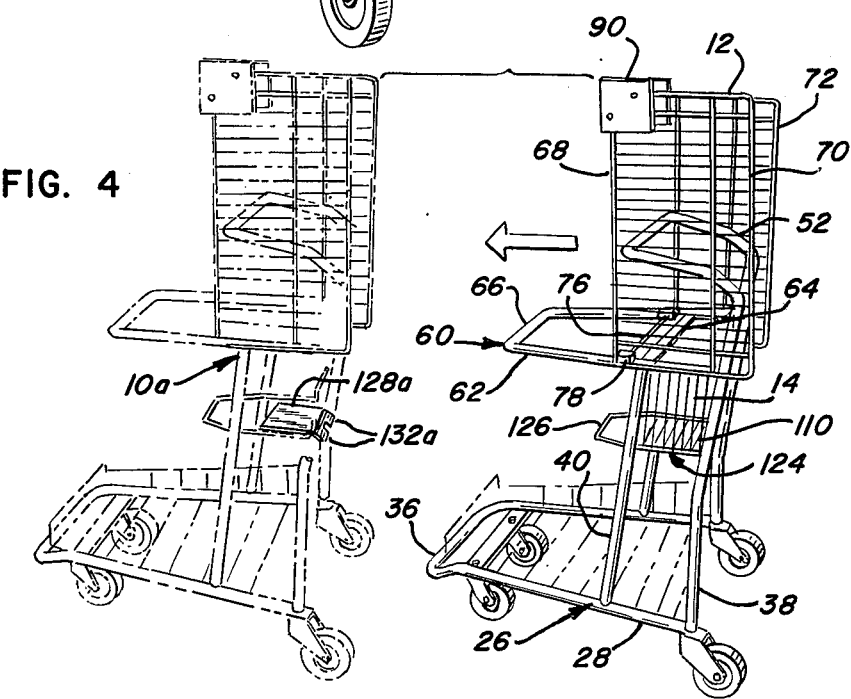
FIG. 4 is a reduced perspective view of the shopping cart showing the upper basket tilted vertically for nesting with another shopping cart.

Referring to FIG. 4, an A-shaped upper basket support 60 is cantilevered from the post-like supports 38 for supporting the upper basket 12. The upper basket support 60 includes upper horizontal runners 62 extending forwardly from each of the upright arms 46 and 48, respectively, to a position slightly forward of the longitudinal centerline of the bottom of the upper basket 12. The upper ends of front posts 40 and 42 are welded to the upper horizontal runners 62. A cross brace 64 connects the upper horizontal runners 62 adjacent the front posts 40 and 42. A cross bar 66 connects the front ends of the upper horizontal runners 62.

Referring now to the elongated upper basket 12, the upper basket 12 has a bottom 68, preferably rectangular in shape, for carrying groceries and the like. The bottom is desirably positioned at a height slightly above the counter to which the goods in the basket are to be transferred, and there bagged. A pair of elongated side walls 70 and 72 (FIGS. 1, 4 and 6) extend upwardly from the bottom 68 of the upper basket 12 to a height adjacent the level of horizontal runners 54 and 56 and crossbar 58. The side walls 70 and 72 are spaced in general parallel relationship to each other. A pair of spaced, generally parallel, upright end walls, including a rear wall 39 and a front wall 74, extend laterally between and adjacent the side walls 70 and 72 at the rearward and forward ends of the upper basket 12, respectively. In the preferred embodiment, the front wall 74 comprises a pivotable drop gate. In the illustrative embodiment shown, the rear wall 39 and gate 74 extend upwardly from the bottom 68 of the basket 12 to a height slightly below the top of the side walls 70 and 72. The elongated side walls 70 and 72, the rear wall 39 and the gate 74 are generally rectangular in shape.

In order to accommodate tilting of the upper basket 12 to an upright position for nesting with other similar shopping carts as shown in FIG. 4, a pivotable rearward crossbar 76 is provided at the back edge of the bottom 68 of the upper basket 12. The cross bar 76 is pivotally mounted within bearings or nylon bushings 78 which are strapped to the top surfaces of each of the upper horizontal runners 62 of the upper basket support 60, respectively, adjacent the cross brace 64 of the upper basket support 60. The minimum horizontal distance between the elongated side walls 70 and 72 is greater than the maximum horizontal distance between the outer surfaces of the auxiliary side walls 22 and 24 to permit the side walls 70 and 72 to tilt upwardly in side-by-side relationship to the auxiliary side walls 22 and 24.

Figure 6:
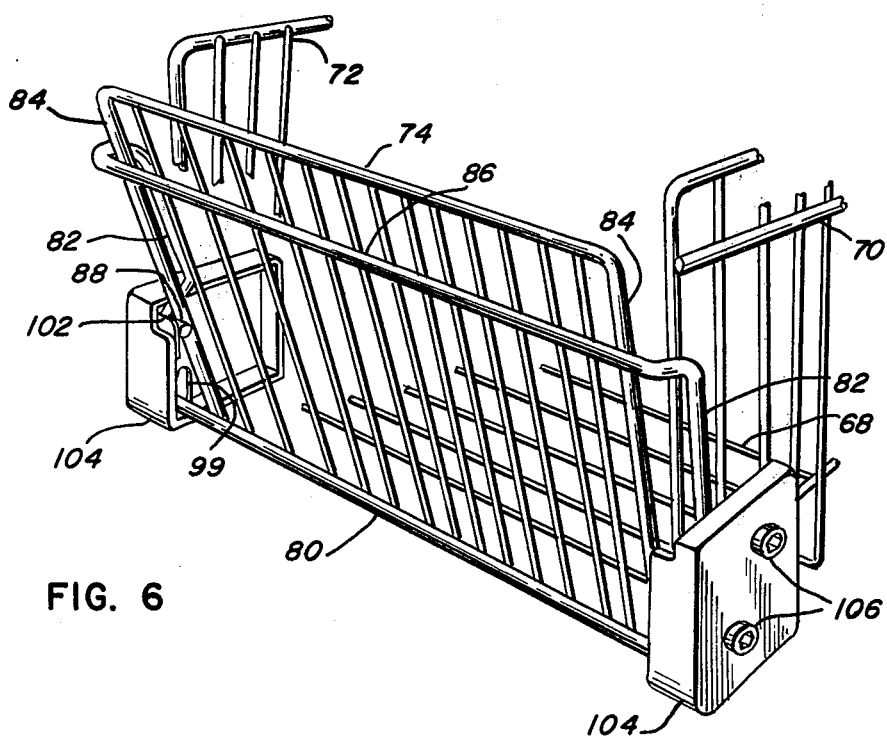
FIG. 6 is a fragmentary perspective view of the front of the upper basket with the gate in an upright, closed position.

One of the novel features of this invention is an improved gate catch and gate construction for securely locking the gate 74 in an upright closed position to effectively and reliably retain groceries in the upper basket 12 and yet allow the gate to be easily pivoted from the upright closed position to a lowered open position where the gate 74 can serve as a ramp for unloading groceries from the upper basket 12 onto the counter of a checkstand. To this end, the novel gate 74 is provided with a pivotable cross-member 80 generally at, and extending laterally across, the bottom of the gate as best shown in FIG. 6. The pivotable cross-member 80 is positioned adjacent the bottom 68 of the upper basket 12, and preferably slightly below the bottom 68, when the gate 74 is in an upright closed position.

Figure 2:
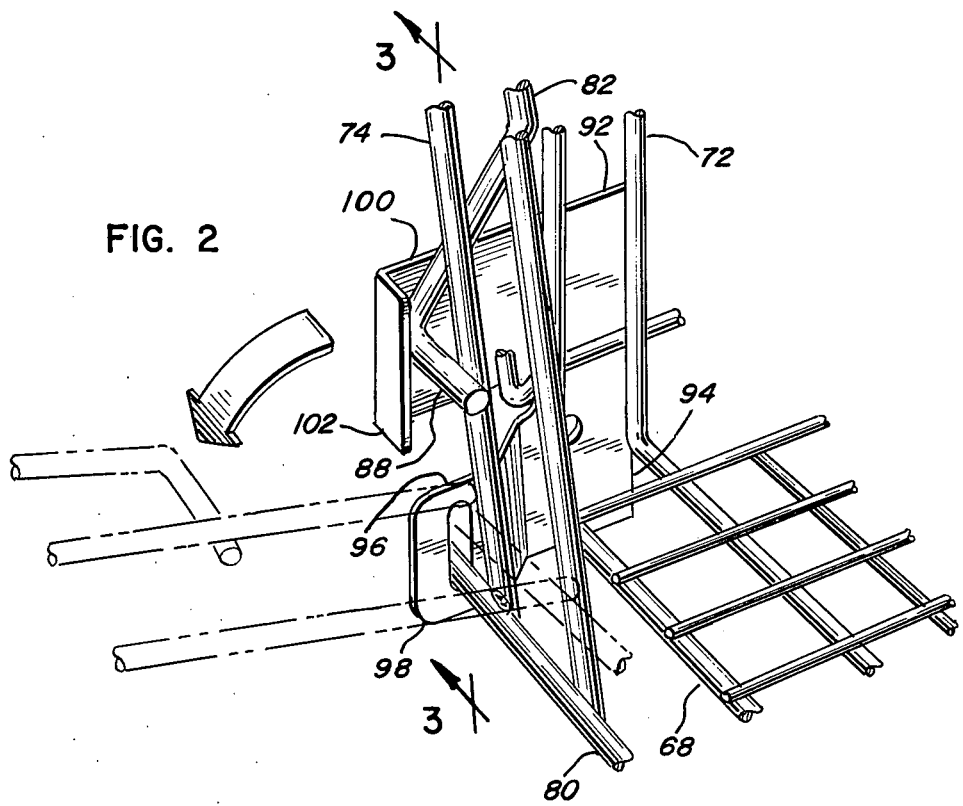
FIG. 2 is an enlarged, fragmentary, perspective view of the gate catch construction, illustrating in solid line the latch plate and portions of the upper basket and the front gate in the upright closed position, and illustrating in phantom lines a portion of the gate when opened.

The novel gate 74 has a pair of elongated upright ears 82, with one ear extending laterally outward from each side of the gate 84, respectively, to a position laterally outward past each of the elongated side walls 70 and 72 of the upper basket 12. The upper portion of each ear 82 is [-shaped and bent slightly rearwardly to abut against and engage the side walls 70 and 72 of the upper basket 12 so as to substantially prevent the gate 74 from falling into the interior of the upper basket 12 when the gate 74 is in an upright closed position. A cross-wise rigidifying bar 86 integrally connects the upper ends of ears 82 and extends laterally across the front face of the gate 74 below the top of the gate. Each of the ears 82 terminates at its lower end in an abutment pin 88 that extends and projects laterally inwardly as best shown in FIGS. 2 and 6. In the illustrated embodiment, the pins 88 are positioned slightly inwardly of the elongated side walls 70 and 72 and are elevated above the pivotable cross-member 80.

Figure 3:
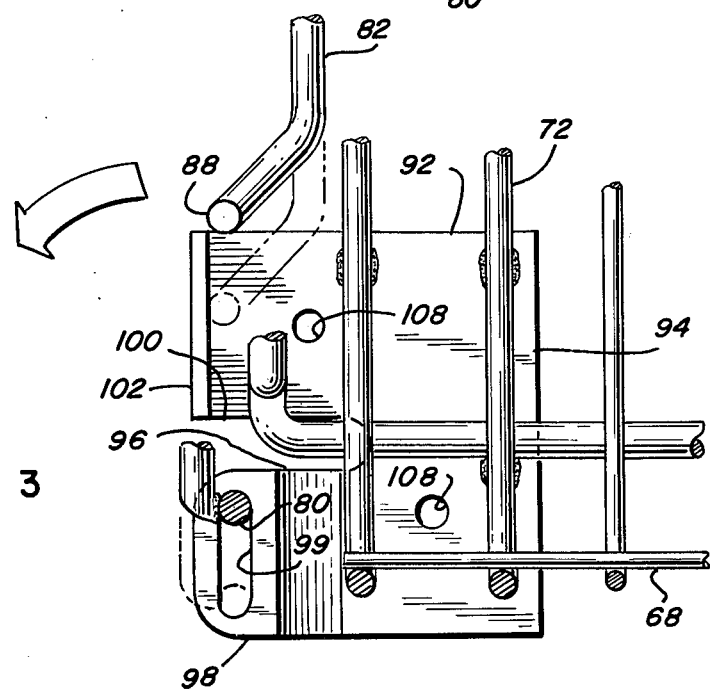
FIG. 3 is a sectional view taken substantially along line 3—3 of FIG. 2 illustrating in solid line the gate when lifted to an upper position and depicting in phantom lines the gate when in an upright, closed position.

Referring now to the novel gate catch, as best shown in FIGS. 1, 2 and 3, the gate catch includes a first latch plate 90 and a second latch plate 92. One of the latch plates 90 is secured to the bottom front corner of side wall 70 while the other latch plate 92 is secured to the bottom front corner of side wall 72. Both of the latch plates are positioned adjacent the bottom 68 of the upper basket and the gate 74. The latch plates 90 and 92 are symmetrical to each other and are preferably made of sheet metal. Each of the latch plates 90 and 92 has a side 94 which is welded to a side wall 70 or 72 and which has a forward portion that extends forwardly of the side walls 70 and 72 to a distance greater than the diameter of pin 88.

The side 94 of each latch plate 90 and 92 has a cut-away portion 96 that has an open ended mouth adjacent the front of the latch plate and which is generally U-shaped in the longitudinal direction. The cut-away portion 96 permits the lower portion of the latch plate which generally defines a lower hinge-like bracket 98 to be bent slightly inwardly of the side walls 70 and 72 of the upper basket 12 relative to the upper side surface 100 which is positioned above the cut-away portion 96.

An end restraining shield 102 is spaced in front of the elongated side walls 70 and 72 of the upper basket 12 and extends and projects laterally inwardly from the upper side-surface 100 and top of each latch plate. The end restraining shield 102 is of a size, strength, and thickness to abuttingly engage and restrain substantial forward movement of the pins 88 of the ears 82 of the gate 74 when the gate is in an upright, closed position. The end restraining shield 102 thus acts to prevent the gate from accidentally opening in a store or when the shopping cart is being pushed over a curb, or along a parking lot or on another bumpy surface. In the illustrated embodiment, the end restraining shield 102 is elongated, upright and generally rectangular in shape.

As best shown in FIG. 2, the lower hinge-like bracket 98 defines an oblong slot 99, which in the illustrative embodiment is elongated and upright, for slidably receiving the pivotable cross-member of the gate 74. Each slot 99 is of a length to permit the cross-member 80 to move from a lower position, as shown in phantom in FIG. 3, when the gate 74 is in an upright closed position to an upper position, as shown in solid line in FIG. 3, when the gate is lifted to enable the pins 88 of the ears 82 to be moved above the end restraining shield 102 and be subsequently lowered to an unrestrained position in front of the end restraining shield 102 when opening the gate 74. It can thus be seen that when the gate is in an upright closed position, the gate is restrained in an area between the front of the elongated side walls 70 and 72 of the upper basket 12 and the end restraining shield 102 with the ears 82 of the gate 74 limiting the rearward movement of the gate and with the pins 88 of the gate limiting the forward movement of the gate. This construction substantially prevents the gate 74 from being accidentally opened when the shopping cart 10 is being improperly pulled by the front gate 74.

In order to protect the latch plate 90 and 92 and upper basket 12 from impact forces during accidental collision with other shopping carts or with shelves, a bumper 104 may be mounted externally over the side 94 and end restraining shield 102 of the latch plate via bolts 106 as best seen in FIG. 6. Mounting holes 108 are provided in the latch plates as shown in FIG. 3 for receiving the bolts 106 (the bumper has been omitted from FIG. 3 for ease of understanding and clarity). The bumper 104 is preferably made of impact-resistant plastic, although other materials such as rubber can be used.

An important aspect of this invention is the orientation of a novel baby basket 14 which is spaced away from the interior of the elongated upper basket 12 so as to provide improved carrying means for carrying a baby or small child. As best shown in FIG. 1, the baby basket 14 includes a seat 110 positioned below the level of the bottom 58 of the upper basket 12 to carry and support a child so that the child's center of gravity is substantially below the level of the bottom of the upper basket 12. This particular arrangement lowers the center of gravity of the shopping cart 10 and enhances the stability of the cart and generally provides improved means for preventing the child from accidentally falling out of the shopping cart.

A back support 112 extends upwardly from the seat 110 of the baby basket 14. Preferably, the back support 112 is positioned in general vertical alignment with the rear wall 39 of the upper basket 12. In the preferred embodiment, the back support 112 and the rear wall 39 are positioned closely adjacent each other so that the rear wall 39 also serves to support the back of the child sitting in the baby basket 14. In the preferred construction, the rear wall 39 is of a height to substantially prevent the child from reaching the interior of the upper basket 12 and grabbing the groceries, which the child may break or injure himself with or throw onto the floor to create a hazard for others, or lifting the gate and causing the groceries in the upper basket 12 to spill into the aisle.

The baby basket 14 also has a crotch-like end wall 114 which is spaced rearwardly of both the rear wall 39 of the upper basket 12 and the back support 112 of the baby basket 14 so that the crotch-like end wall 114 is positioned outside the area directly below the bottom 68 of the upper basket 12. The crotch-like end wall 114 defines a pair of rectangular leg holes 116 and 118 for desirably positioning the child sitting in the baby basket 14 facing away from, and remote from, the gate 74 and generally facing toward his mother when she is pushing the shopping cart 10. Such positioning and orientation of the child offers a number of advantages: (1) the child sitting in the baby basket 14 is substantially prevented from kicking the bottom 68 of the upper basket 12 or the gate 74; (2) the child is prevented from kicking items on the lower basket 16, which can be particularly dangerous to both the child and customers in the store if there are glass bottles on the lower basket 16; (3) when pushing the cart, the mother can observe the face of the child and attend to the child's needs such as by wiping the child's face or nose, and can talk directly to the child; and (4) the child faces the mother when she is pushing the shopping cart 10 and thus the child can generally feel more secure than if he faces the front wall or gate 74 of the cart with the back of his head towards his mother.

A pair of lower side walls 120 and 122 extend upwardly from the seat 110 of the baby basket 114 and are spaced apart in general parallel relationship. The lower side walls 120 and 122 extend between and connect the back support 112 and the crotch-like end wall 114. In the illustrative embodiment, the back support 112, the crotch-like end wall 114 and the lower side walls 120 and 122 are generally of the same height and have a general rectangular configuration The auxiliary side walls 22 and 24 are located generally above and are positioned closely adjacent the lower side walls 120 and 122, respectively, to substantially prevent the child from reaching laterally outward of the baby basket and grabbing items on the shelves. The auxiliary side walls also serve as a barrier to protect the child's arms and sides from the corners of shelves and from other carts. The upper edges of the auxiliary side walls are inclined and spaced below the hand grips 50 and 52 so as to provide adequate clearance space for grasping the hand grips.

The baby basket 14 also desirably includes a leg hole closure or flap 128 which is made out of impact-resistant plastic or other suitable material. The flap 128 has a rectangular section 130 (FIG. 5) and skirt sections 132 (FIG. 1) which extend downwardly from the rectangular section 130 through each of the leg holes 116 and 118 when the flap 128 is positioned against the seat 110. The corner of the flap, which is formed by the junction of the rectangular section 130 and skirt sections 132 is pivotally connected to the cross wire 134 (FIG. 5) of the seat 110 adjacent the crotch-like end wall 114. Preferably, the corner of the flap is duck-billed or bifurcated for snap-fitting engagement with the cross wire 134. The flap 128 is pivotable within the interior of the baby basket 14 from a cushioning position lying upon the seat 110 to an upright closure position against the crotch-like end wall 114 and substantially blocking the leg holes 116 and 118 for permitting groceries to be carried in the baby basket.

The baby basket 14 further includes a striker or leg hole closure activating member 124 that is connected to and rigidifies the underside of the seat 110 a shown in FIG. 4. The striker 124 has a generally U-shaped bight or striker head 126 that extends longitudinally and is cantilevered from the seat 110 towards the front of the shopping cart 10 and is located beneath the upper basket 12 for striking the skirt sections 132a of the leg hole closure 128a of an adjacent shopping cart 10a (FIG. 4) to pivot the leg hole closure 128a of the adjacent shopping cart 10a into an upright closure position when the shopping cart 10 is nested with the adjacent cart 10a. Such action and pivoting is desirable to keep the leg hole closure normally in an upright position and prevent groceries from falling out of the leg holes of the baby basket when the baby basket is used to carry groceries. This striking action and subsequent closure of the flap or leg hole closure requires the parent to lower the leg hole closure to the cushioning position before seating a child in the baby basket.

Although the baby basket 14 is particularly advantageous with a pivotable front wall or gate 74, it may be desirable to use the baby basket 14 with a stationary front wall.

Preferably, the shopping cart 10 defines a clearance space between the auxiliary side walls 22 and 24 and above the crotch-like end wall 114 for safely permitting forward rocking movement of the child's head substantially without bumping the child's forehead on any crosswise extending member or impediment. Thus, the novel shopping cart 10 avoids the use of prior art handles that extend crosswise adjacent the baby's forehead and utilizes instead novel grips 50 and 52 that enhance child safety and result in improved maneuverability and control of the cart 10.

The above detailed description has been given for ease of understanding only. No unnecessary limitations are to be understood therefrom, as modifications will be obvious to those skilled in the art.

What is claimed is:

1. A shopping cart, comprising:
an elongated upper basket having a bottom for carrying groceries and the like, a pair of spaced elongated side walls extending upwardly from said bottom at a height sufficient to retain said groceries in said upper basket without the use of a supporting removable basket thereon, and a pair of spaced upright end walls including a front wall and a stationary rear wall extending between said side walls;
a baby basket spaced away from the interior of said elongated upper basket and including a seat positioned below the level of the bottom of said elongated upper basket for carrying a child so that the child's center of gravity is substantially below the level of the bottom of said elongated upper basket, a stationary back support extending upwardly from said seat, a crotch-like end wall spaced rearwardly of said rear wall and said back support so as to be positioned outside the area directly below the bottom of said elongated upper basket and defining a pair of leg holes below the level of the bottom of said elongated upper basket for positioning the child facing away from and remote from the front wall of said elongated upper basket to substantially prevent the child from reaching into said elongated upper basket and from kicking the bottom of said elongated upper basket, and a pair of spaced lower side walls extending between said back support and said crotch-like end wall; and
a support frame including a base having front and rear wheels, post-like support means extending upwardly from said base including baby-basket support means for securely engaging said lower side walls at locations adjacent said crotch-like end wall and said stationary back support to securely carry and support said baby basket, upper basket support means cantilevered from said post-like support means for supporting said elongated upper basket, and means fixedly connecting portions of said elongated upper basket to said upper basket support means for substantially preventing removal of said elongated upper basket.

2. A shopping cart in accordance with claim 1 wherein said back support is positioned entirely below said elongated upper basket and said back support and said rear wall of said elongated upper basket are positioned substantially in vertical alignment with each other, and are positioned closely adjacent each other so that said rear wall also serves to support the back of said child.

3. A shopping cart in accordance with claim 2 further including a pair of upright auxiliary side walls extending longitudinally from the stationary rear wall of said elongated upper basket in a direction away from the front wall of said elongated upper basket and located generally above the lower side walls of said baby basket, said auxiliary side walls and said lower side walls cooperating to provide a barrier extending from a height generally below the level of the bottom of said upper basket to the top of said upper basket for substantially preventing the child from putting his arms laterally outward of the baby basket and reaching items on the shelves of the store and for substantially protecting the child's arms and sides from the corners of said shelves and from other carts.

4. A shopping cart in accordance with claim 1 wherein said post-like support means include a pair of upright arms positioned adjacent said crotch-like end wall and extending substantially vertically to a height above the bottom of said upper basket and said post-like support means include a handle grip means extending upwardly from each of said upright arms, said handle grip means being inclined forwardly and generally toward the top of the rear wall of said upper basket, said handle grip means being in general longitudinal alignment with said side walls of said elongated upper basket, and said shopping cart defines a clearance space between said handle grip means and above said crotch-like end wall for safely permitting forward rocking movement of the child's head substantially without bumping the child's forehead on any crosswise extending member.

5. A shopping cart, comprising:
an elongated upper basket having a bottom for carrying groceries and the like, a pair of spaced elongated side walls extending upwardly from said bottom and a pair of spaced upright end walls including a front wall and a rear wall extending between said side walls;
said front wall defining a gate adapted to be pivoted from an upright closed position for retaining groceries in said elongated upper basket to a downward open position for unloading groceries from said elongated upper basket, said gate having a pivotable cross-member generally at the bottom of the gate and disposed adjacent the bottom of said elongated upper basket when said gate is in an upright closed position and said gate having an ear extending laterally outward past each of said elongated side walls for engaging said elongated side walls to prevent said gate from substantially falling into the interior of said elongated upper basket when said gate is in an upright closed position, each of said ears including pin means projecting laterally inwardly;
gate catch means, including a first latch plate and a second latch plate, secured to each of the bottom corners of said elongated side walls adjacent said bottom and said gate, each of said latch plates including an end restraining shield spaced in front of said elongated side walls and projecting laterally inwardly for abuttingly engaging said pin means to hold said gate in an upright closed position so as to substantially prevent said gate from opening in the store and when said shopping cart is pushed along a parking lot or a bumpy surface and each of said latch plates defining a slot for slidably receiving said pivotable cross-member, said slot being of a length to permit said cross-member to move from a lower position when said gate is in an upright closed position to an upper position when said gate is lifted to enable said pin means to be moved above said end restraining shield and be subsequently lowered to an unrestrained position in front of said end restraining shield when opening said gate; and
a support frame including a base having front and rear wheels, post-like support means extending upwardly from said base and upper-basket support means cantilevered from said post-like support means for supporting said upper basket.

6. A shopping cart, comprising:
an elongated upper basket having a bottom for carrying groceries and the like, a pair of spaced elongated side walls extending upwardly from said bottom, and a pair of spaced upright end walls including a front wall and a rear wall extending between said side walls;
said front wall defining a gate adapted to be pivoted from an upright closed position for retaining groceries in said elongated upper basket to a downward open position for unloading groceries from said elongated upper basket, said gate having a pivotable cross-member generally at the bottom of the gate and disposed adjacent the bottom of said elongated upper basket when said gate is in an upright closed position and said gate having an ear extending laterally outward past each of said elongated side walls for engaging said side walls to prevent said gate from substantially falling into the interior of said elongated upper basket when said gate is in an upright closed position, each of said ears including pin means projecting laterally inwardly;
gate catch means, including a first latch plate and a second latch plate, secured to each of the bottom corners of said elongated side walls adjacent said bottom and said gate, each of said latch plates including an end restraining shield spaced in front of said elongated side walls and projecting laterally inwardly for abuttingly engaging said pin means to hold said gate in an upright closed position so as to substantially prevent said gate from opening in the store and when said shopping cart is being pushed along a parking lot or a bumpy surface and each of said latch plates defining a slot for slidably receiving said pivotable cross-member, said slot being of a length to permit said cross-member to move from a lower position when said gate is in an upright closed position to an upper position when said gate is lifted to enable said pin means to be moved above said end restraining shield and be subsequently lowered to an unrestrained position in front of said end restraining shield when opening said gate;
a baby basket spaced away from the interior of said elongated upper basket and including a seat positioned below the level of the bottom of said elongated upper basket for carrying a child so that the child's center of gravity is substantially below the level of the bottom of said elongated upper basket, a back support extending upwardly from said seat, a crotch-like end wall spaced rearwardly of said rear wall and said back support so as to be positioned outside the area directly below the bottom of said elongated upper basket and defining a pair of leg holes for positioning the child facing away from and remote from the front wall of said elongated upper basket to substantially prevent the child from kicking the bottom of said elongated upper basket or said gate, and a pair of spaced lower side walls extending between said back support and said crotch-like end wall; and
a support frame including a base having front and rear wheels, post-like support means extending upwardly from said base including baby basket support means for supporting said baby basket, and upper-basket support means cantilevered from said post-like support means for supporting said elongated upper basket.

7. A shopping cart in accordance with claim 6 wherein said back support and said rear wall of said elongated upper basket are positioned in general vertical alignment with each other, and are positioned closely adjacent each other so that said rear wall also serves to support the back of said child and said rear wall is of a height to substantially prevent said child from reaching into the interior of said elongated upper basket or lifting said gate.

8. A shopping cart in accordance with claim 7 further including a pair of upright auxiliary side walls extending longitudinally from the rear wall of said elongated upper basket in a direction away from the front wall of said elongated upper basket and located generally above the lower side walls of said baby basket for providing a barrier to substantially prevent the child from putting his arms laterally outward of the baby basket and reaching the gate or items on the shelves of the store and to substantially protect the child's arms and sides from the corners of said shelves and from other carts.

9. A shopping cart in accordance with claim 8 wherein said post-like support means include handle means extending upwardly from and in general vertical alignment with said auxiliary side walls and said shopping cart defines a clearance space between said auxiliary side walls and above said crotch-like end wall for safely permitting forward rocking movement of the child's head substantially without bumping the child's forehead on any crosswise extending member.

10. A shopping cart in accordance with claim 6 further including an elongated lower basket on said base at a level below said baby basket for carrying groceries and the like, said elongated lower basket spaced away from and located longitudinally opposite the leg holes of said baby basket for substantially preventing the child from kicking the groceries on said elongated lower basket.

11. A shopping cart in accordance with claim 6 wherein said baby basket further includes a flap pivotally connected to said seat and being movable within the interior of said baby basket from a cushioning position lying upon said seat to an upright closure position against the crotch-like end wall and substantially blocking the leg holes for permitting groceries to be carried in said baby basket.

12. A shopping cart in accordance with claim 11
wherein said flap includes a skirt section extending downwardly through each of the leg holes when said flap is in a cushioning position; and
said shopping cart further includes means for tilting said elongated upper basket to an upright position for nesting, and
a leg hole closure activating member disposed at a level immediately below the level of the seat of said baby basket and having a generally U-shaped bight defining a striker head projecting longitudinally forwardly of said seat to strike the skirt section of the flap of another shopping cart, and thereby pivot the skirt section of said flap of the other shopping cart to an upright closure position, during nesting of said shopping carts.

13. A shopping cart, comprising:
an elongated upper basket having a bottom for carrying groceries and the like, a pair of spaced elongated side walls extending upwardly from said bottom, and a pair of spaced upright end walls including a front wall and a rear wall extending between said side walls;
a baby basket spaced away from the interior of said elongated upper basket and including a seat positioned below the level of the bottom of said elongated upper basket for carrying a child so that the child's center of gravity is substantially below the level of the bottom of said elongated upper basket, a back support extending upwardly from said seat, a crotch-like end wall spaced rearwardly of said rear wall and said back support so as to be positioned outside the area directly below the bottom of said elongated upper basket and defining a pair of leg holes for positioning the child facing away from and remote from the front wall of said elongated upper basket to substantially prevent the child from reaching into said elongated upper basket and from kicking the bottom of said elongated upper basket, and a pair of spaced lower side walls extending between said back support and said crotch-like end wall;
a support frame including a base having front and rear wheels, post-like support means extending upwardly from said base including baby-basket support means for supporting said baby basket, and upper basket support means cantilevered from said post-like support means for supporting said elongated upper basket;
said baby basket further having a flap pivotally connected to said seat and being movable within the interior of said baby basket from a cushioning position lying upon said seat to an upright closure position against the crotch-like end wall and substantially blocking the leg holes for permitting groceries to be carried in said baby basket, said flap having a skirt section extending downwardly through each of the leg holes when said flap is in a cushioning position;
means for tilting said elongated upper basket to an upright position for nesting; and
a leg hole closure activating member disposed at a level immediately below the level of the seat of said baby basket and having a generally U-shaped bight defining a striker head projecting longitudinally forwardly of said seat for striking the skirt section of the flap of another shopping cart to pivot the skirt section of said flap of the other shopping cart to an upright closure position during nesting of said shopping carts.

* * * * *

UNITED STATES PATENT AND TRADEMARK OFFICE
CERTIFICATE OF CORRECTION

PATENT NO. : 4,116,456

DATED : September 26, 1978

INVENTOR(S) : Don A. Stover, Norman R. Young, Glenmore J. Runnion

It is certified that error appears in the above–identified patent and that said Letters Patent are hereby corrected as shown below:

Column 3, line 58, "lot" should be --slot--;
Column 9, line 36, "a" should be --as--.

Signed and Sealed this

Nineteenth Day of December 1978

[SEAL]

Attest:

RUTH C. MASON
Attesting Officer

DONALD W. BANNER
Commissioner of Patents and Trademarks